H. L. TANNER AND H. H. THOMPSON.
GYROSCOPIC COMPASS.
APPLICATION FILED MAY 27, 1915.

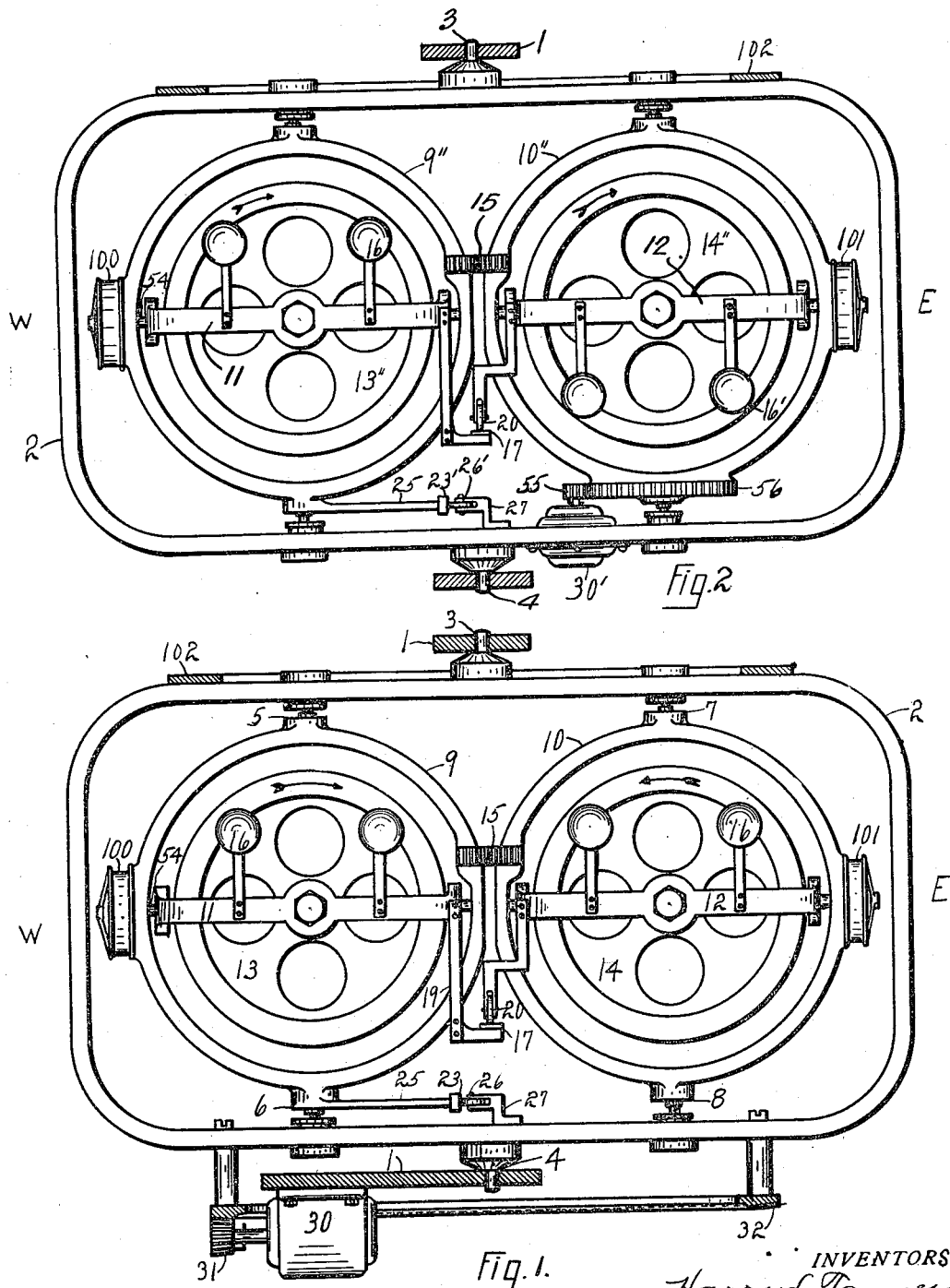

1,309,592.

Patented July 8, 1919.
3 SHEETS—SHEET 2.

INVENTORS
Harry L. Tanner
and
Herbert H. Thompson

H. L. TANNER AND H. H. THOMPSON.
GYROSCOPIC COMPASS.
APPLICATION FILED MAY 27, 1915.

1,309,592.

Patented July 8, 1919.
3 SHEETS—SHEET 3.

INVENTORS
Harry L. Tanner
and
Herbert H. Thompson.

UNITED STATES PATENT OFFICE.

HARRY L. TANNER AND HERBERT H. THOMPSON, OF BROOKLYN, NEW YORK, ASSIGNORS TO THE SPERRY GYROSCOPE COMPANY, OF BROOKLYN, NEW YORK, A CORPORATION OF NEW YORK.

GYROSCOPIC COMPASS.

1,309,592.  Specification of Letters Patent.  Patented July 8, 1919.

Application filed May 27, 1915. Serial No. 30,854.

*To all whom it may concern:*

Be it known that we, HARRY L. TANNER and HERBERT H. THOMPSON, citizens of the United States of America, residing at Brooklyn, New York, have invented certain new and useful Improvements in Gyroscopic Compasses, of which the following is a specification.

This invention relates to gyroscopic apparatus for positively indicating direction on movable vessels and the like.

According to our invention, we have devised an entirely new type of instrument, which, while not different to a very great extent from the present forms of gyroscopic compasses in point of construction, operates on a very different principle. All of the present forms of gyro compasses operate on the same broad principle which may be simply stated thus:—That a pendulously mounted gyroscope which has a normally horizontal spinning axis and a vertical precession axis will set itself in azimuth with its axis in the N. S. line so that the direction of its rotation is the same as that of the earth on its axis, or in other words so that it will revolve in a clockwise direction, looking north. We have discovered that by a very simple change in the construction of the gyroscope, namely, by shifting the center of gravity to a point above the horizontal axis that a directional gyroscope may be created which revolves in the opposite direction to the earth's rotation. The advantages of such an instrument are many, especially when placed in the novel combinations which also form a part of our invention.

In the accompanying drawings, the apparatus embodying our invention is illustrated more or less diagrammatically so that the operation may be clearer. Figure 1 is a south elevation of a compass embodying the preferred form of our invention.

Fig. 2 is a similar view of a modified construction.

Figure 3:
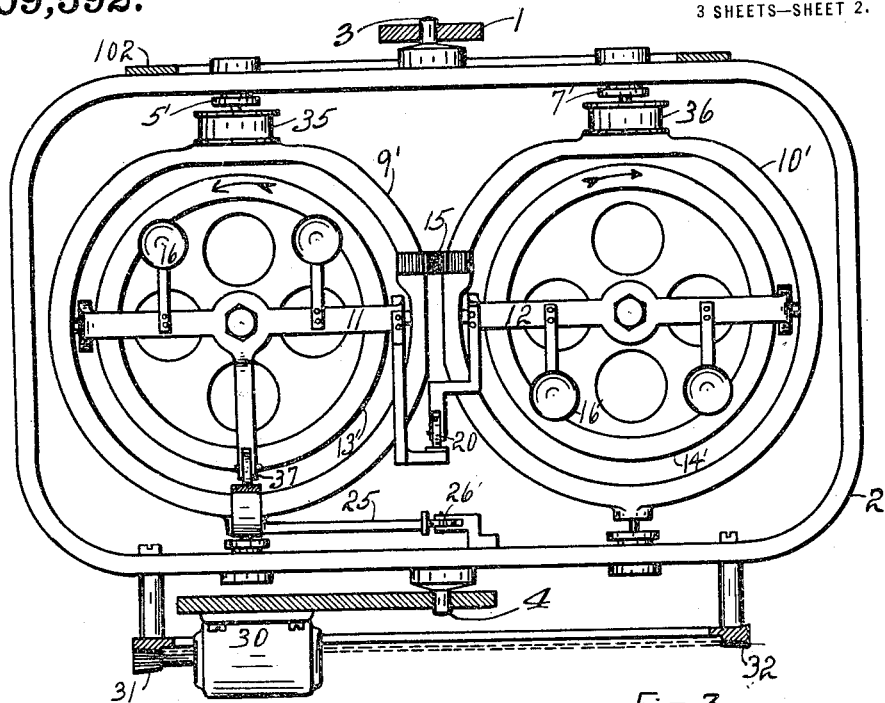
Fig. 3 is a similar view of a third modification.
Figure 4:
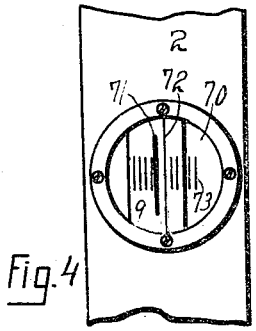
Fig. 4 is a detail side view common to all of the above described forms.
Figure 4A:
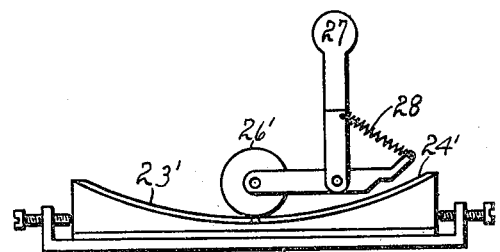
Figure 4B:
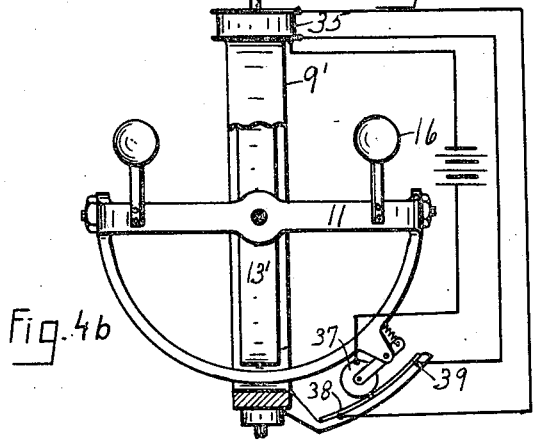

Fig. 4ᵃ is a detail of the type of lower contacts used on Figs. 2 and 3.

Fig. 4ᵇ is an end elevation of Fig. 3, with parts broken away.

Figure 5:
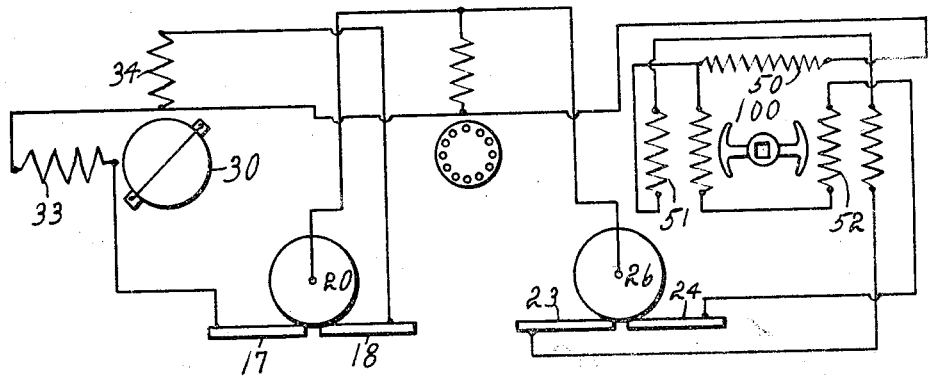

Fig. 5 is a wiring diagram applicable to all said forms.

Figure 6:
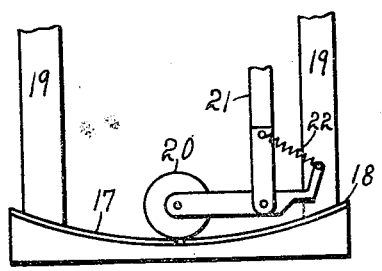

Fig. 6 is a detail of the upper contacts.

Figure 7:
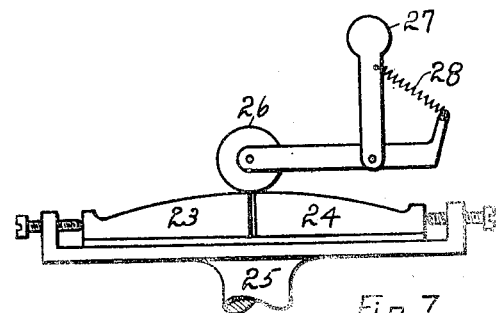

Fig. 7 is a detail of the type of contacts used on the modification shown in Fig. 1.

Figure 8:
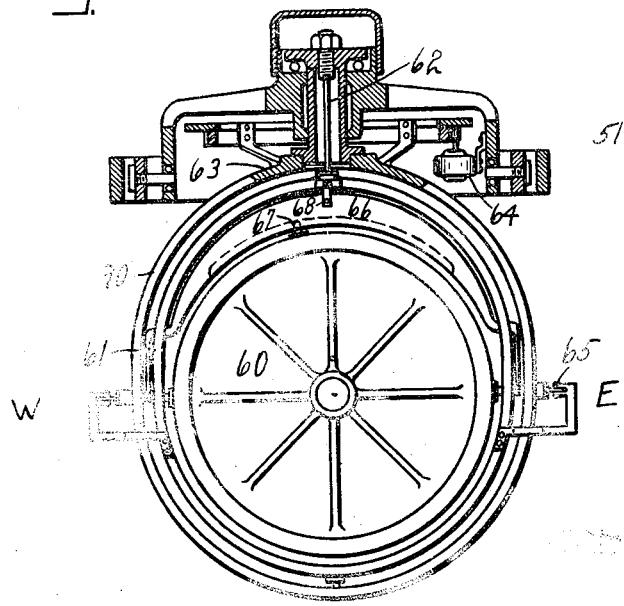

Fig. 8 is a view of our invention as applied to a compass of the "Sperry" type.

Figure 9:
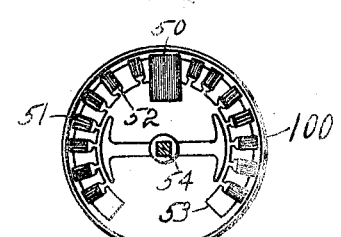

Fig. 9 is a detail of the type of torque-applying motor used in Figs. 1, 2 and 3.

In all of Figs. 1, 2 and 3, the main supporting frame is represented at 1, which may or may not be supported in Cardan rings. A frame 2 is rotatably supported on normally vertical pivots 3, 4 in frame 1, and serves to carry a plurality of vertical bearings 5, 6, 7 and 8 for gimbal rings 9, 9', 9'', 10, 10', 10''. The compass card 102 may also be mounted on frame 2. The casings or bearing frames 11 and 12 for the rotors 13, 13', 13'', 14, 14' and 14'' are supported on horizontal axes in said rings. Said rings are symmetrically arranged within the support 2, being shown as placed side by side and are interconnected for predetermined relative movements.

In the forms of the invention shown, the gyroscopes are connected for opposite and preferably also for equal precession or turning about their vertical axes by means of gears 15. The casings and rotors are shown only diagrammatically, it being understood that preferably they form an induction motor, such for instance as shown in the British patent to Sperry, No. 15,669, July 3, 1911. Also the location of the center of gravity of the gyros is represented graphically by masses 16, 16' attached to the casings. These masses may, if desired, be separately supported from the casing as illustrated in Fig. 8 hereinafter described.

A system of contacts is employed in connection with the gyroscopes. One set is arranged so as to be operated by relative movement of the gyros about their horizontal axes. This set is shown as comprising a pair of reversing contacts 17 and 18 mounted on arms 19 secured to bearing ring 11 and a brush or trolley 20 pivotally mounted on arm 21 secured to bearing ring 12. A spring 22 may be provided to hold the trolley into close engagement with the contact strips.

The other set is constructed so as to be operated by precession of the gyros about their individual vertical axes within frame 2. It preferably comprises a pair of reversing contacts 23 and 24 or 23' and 24' mounted on an arm 25 extending from one of frames 9 or 10 and a trolley 26 or 26' pivotally mounted on a post 27 secured to frame 2, and spring-pressed by a tension spring 28. The reason for the peculiar shape of these contact strips and the electrical mechanism which is controlled from the contacts will be described hereinafter.

So far the description has been applicable to all of Figs. 1, 2 and 3. Fig. 3 will first be considered in detail, as its theory of operation is somewhat simpler than the other figures. It will at once be seen upon inspection that gyro 14' as it is supported within frame 2 represents the fundamentals of the present type of gyro-compass, i. e. it is pendulous, it revolves in the same direction as the earth and it is free to precess about a vertical axis. Gyro 13' differs therefrom in two fundamental particulars. First, it is top-heavy or unstable instead of being pendulous and, second, it revolves in the opposite direction from the rotation of the earth. The behavior of such a gyroscope is peculiar. While it might be expected that, if it were slightly disturbed, it would turn over or at least that it would never straighten up but would revolve in azimuth in complete circles, by proper design and by employing a novel form of damper it is found that the gyroscope will indicate the meridian as truly as the present type of compass. One reason for the fact that it will apparently straighten itself up is thought to lie in the fact that the earth's rotation "catches up" with the gyroscope, so that, if the south end of the gyro were forcibly tilted down slightly while the compass was on the meridian, the resulting precession would carry the gyro-axis to the east, but would maintain the axis otherwise fixed in space. In this position the rotation of the earth would soon cause the south end to apparently rise, thus shifting the masses 16 to the opposite side of the horizontal axis and cause precession back toward the meridian.

By combining this new type of gyroscope with the existing form in the novel combination shown in Fig. 3, several advantages and new results are secured, due principally to the opposite rotation of the two rotors. Any torque about the vertical axis of frame 2, such as that due to friction, will cause relative precession of the gyros about their horizontal axes and thus operate contacts 17—20. In circuit with said contacts is a reversible motor 30 secured to frame 1 and geared to frame 2, as by bevel gears 31, 32. The fields 33 and 34 of said motor are so connected with contacts 17 and 18 as to reverse the motor when the trolley crosses from one contact to the other. Motor 30 not only serves to overcome friction about the vertical axis but aids the gyros in moving the main frame and serves to keep them in the same plane. It should be observed that each gyroscope forms a base line or reference plane for the other in operating contacts 17—20. Thus, if gyroscope 14' should become inclined, gyroscope 13' would form a base line therefor to bring it back to its original position.

For the purpose of damping the oscillations of the compass, I prefer to use in connection with this type of compass an electromagnetic device or devices 35, 36 adapted to exert torques about the vertical axes of the gyros within frame 2. To control these devices, I may make use of the contact system 23'—26' (Fig. 4ª), but quicker action is secured by providing one of the gyro casings with a trolley 37 adapted to make contact with reversing contacts 38, 39, similar to the other contacts, on ring 9' (Fig. 4ᵇ).

The structure of devices 35 and 36 is similar to that of motors 100, 101, described hereinafter, but their action is quite different. Motors 35 and 36 simply act to centralize the gyros about their vertical axes after the fashion of a centralizing spring, but with this difference, that the motors are preferably brought into action by the tilting of a gyro about its horizontal axis.

Coming now to Fig. 2, it will at once be seen that gyro 14'' will operate similarly to gyro 14' of Fig. 3. It will be seen, however, while gyro 13'' is top-heavy like gyro 13', that it is represented as revolving in the opposite direction, or, in other words, in the same direction as the earth and in the same direction as gyro 14''. The behavior of this gyro is quite different, its condition becoming essentially unstable, so that if slightly disturbed, the effect of gravity acting on masses 16 would be to cause it to precess farther away from the meridian. Its behavior is closely similar to that of the unstable gyroscope which is described in the copending application of Harry L. Tanner for a gyroscopic compass, Ser. No. 28,266, filed May 15, 1915, although its general structure is quite different. We make use of means similar to those described in said application for converting this unstable tendency into a positive directive force equal in power to that of gyro 14''.

The contacts 23', 24' and 26', are in circuit with a torque-applying device 100 which is adapted to apply a torque about the horizontal axis of gyro 13'' on precession of the gyros on their vertical pivots within the frame. The preferred construction of said device is shown in Figs. 5 and 9. The windings comprise a field 50 and a pair of oppositely wound armature coils 51, 52 all placed on a stationary part 53. The rotor is preferably attached directly to the axle 54 of ring 11 and is without windings. The shifting of the magnetic flux caused by the trolley crossing from one contact to another causes a torque to be exerted on the rotor. The device is so designed as to oppose and more than overbalance the torque due to gravity acting on masses 16 so that it will cause the gyro to precess back toward the meridian.

We have shown a device 101 similar to device 100 located on ring 10'', which may be brought into action in case both gyros are reversed. In such a case gyro 14'' would act exactly as the unstable gyro described in Mr. Tanner's application referred to above, while gyro 13'' would become identical with gyro 13' of Fig. 3. The conjoint action of the apparatus would be unaffected, however.

According to this modification, a different means is used to cause the gyros to act together and keep in the same plane. The motor 30' is geared directly to one of frames 9'', 10'' as by pinion 55 and gear 56, so as to apply equal and opposite torques about the individual vertical axes of the gyros. Said motor is controlled by the relative oscillation of the gyros through contacts 17—20, in like manner as motor 30.

This form of compass possesses the important advantage that it is not subject to deviations due to rolling of the ship, as most of the present types of compasses are. By exhaustive experiments, it has been determined that such deviations are caused by the action of acceleration forces due to swinging of the compass. These forces act on the unbalanced masses of the gyros (represented by masses 16 and 16') and produce torques about their individual vertical axes. The direction of this torque is dependent upon the location of the center of gravity of the gyro, so that it would be in opposite directions on gyros 13'' and 14''. Such torques would produce opposite precession about the horizontal axes of the two gyros, since the gyros rotate in the same direction, and hence motor 30' would be brought into action to counterbalance their effect. It is interesting to note that by reversing only gyroscope 13'', that the motor 100 becomes unnecessary as pointed out in connection with Fig. 3.

We are now prepared to consider the preferred form of our invention, as represented in Fig. 1. Both gyros, it will be observed, are top-heavy, unlike Figs. 2 and 3, and rotate in opposite directions. Gyro 14, if rotated as indicated, will operate on the same principle as gyro 13' of Fig. 3, that is it will positively seek the meridian, while gyro 13 will operate in like manner as gyro 13'' of Fig. 2. Accordingly similar means are employed to control it, such as torque-applying device 100 and contacts 23—26. Also, for aiding the gyros in turning the main frame and for keeping them in the same plane, motor 30 and contacts 17—20 are again used as in Fig. 3.

The compass shown in Fig. 1 combines the advantages and eliminates the disadvantages of the compasses shown in Figs. 2 and 3. Motor 30, governed by contacts 17—20 acts precisely as it does in Fig. 3 to eliminate the errors due to friction about the vertical axis. At the same time, motor 30 also acts to eliminate the errors due to rolling in a similar fashion to the action of motor 30' of Fig. 2, but through a slightly different cycle of causes and effects. In Fig. 1, rolling would produce torques about the vertical axes of the two gyros in the same direction since both gyros are top-heavy, and hence since they rotate in opposite directions equal and opposite precession about the horizontal axis would be caused, which would bring into action motor 30 and thus prevent deviation.

For damping our preferred form of compass, we employ an entirely new method. With the ordinary compass it is necessary to oppose movement about the vertical axis in order to damp it, as by friction or springs, or as is done in the Sperry type of compass. In our compass, however, such a damper would only serve to increase the oscillations of the compass. That this is so will be appreciated from the following analysis:

If rotor 14 were disturbed, for instance, the action of gravity on masses 16 would set up precession around the vertical axis. If this precession were opposed by the usual form of damper the effect would be to cause movement of the gyroscope in the direction of the primarily applied force or, in other words, would cause the gyroscope to turn farther over and thus increase the rate of precession. In order to damp our compass we apply a positive torque about the vertical axis of each gyro in the direction of motion of precession. Such a torque, it will be seen, will quickly lessen the precession by causing the gyroscope to straighten up, thus lessening the amount of the applied torque around the horizontal axis. One method of making such a damper is to shape the contacts 23, 24 somewhat as shown in Fig. 7 so that the spring-pressed trolley 26 acting thereon will exert a torque on the arm 25, tending to turn the frames 9 and 10 further about their pivots when the trolley is slightly displaced from its central position. It should be noted that in the shaping of these contacts 23 and 24, Fig. 1 is radically different from Figs. 2 and 3. In the latter figures the contacts 23', 24' are preferably shaped so as to centralize the gyroscopes and thus perform the function of the usual type of damper. It should also be noted that the form of magnetic damper shown in Fig. 3 is equally applicable to Figs. 1 and 2, but that if it were used on Fig. 1, the connections should be reversed so as to accelerate the precession, rather than to retard it.

In all of these figures we prefer to employ some form of indicator to aid in quickly setting the gyroscopes on the meridian. Such an indicator is preferably designed to show the relative position of either or both of the gyroscopes about their vertical axes with respect to the main frame 2. Fig. 4 shows one form such an indicator may assume. A window 70 is provided in one or both ends of the frame 2 through which may be seen a mark 71 on frame 9 or 10. The window is provided with a central crosshair 72 and preferably also with other division marks 73, so that a ready indication of the position of the vertical rings with respect to the frame 2 is provided.

In Fig. 8 we have shown our invention as applied to the Sperry type of gyroscopic compass. In this type the gyroscope proper 60 is statically balanced on horizontal pivots within the vertical ring 61. Said ring is suspended by a torsion filament 62 from a follow-up device 63 which is driven by a motor 64 controlled by contacts 65, so that said device follows the azimuth movements of the gyroscope. While in Figs. 1, 2 and 3 we have shown the gyroscopes themselves as top-heavy about the horizontal axis, it will of course be obvious that our invention is not limited thereto but is also applicable to the case where a top-heavy weight, such as bail 66 carried by the phantom ring 90 of the follow-up device 63 is used to impart the same quality to a statically balanced gyroscope 60. The connection 67 between the bail and the gyroscope is preferably made eccentric as in the Sperry compass but it is placed slightly west instead of east of the center line of the gyroscope so that the bail will in effect exert a torque about the vertical axis of the gyroscope in the same direction that the gyroscope normally moves off the meridian at the same time that it exerts a torque about the horizontal axis. With such an arrangement no damping means is required, the application of this single torque about an axis slightly inclined to the horizontal being sufficient to cause the gyroscope to quickly come to rest on the meridian. If desired, a latch 68 may be employed to hold the gyroscope in a vertical position when not running so as to prevent its turning over. Said latch of course is turned out of the way when the gyroscope is operating.

In accordance with the provisions of the patent statutes, we have herein described the principle of operation of our invention, together with the apparatus which we now consider to represent the best embodiment thereof, but we desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described our invention, what we claim and desire to secure by Letters Patent is:

1. In a gyro-compass, the combination with a rotor and rotor bearing casing, of means for supporting the same for turning about a vertical axis, and for oscillation about a horizontal axis at an angle to its spinning axis, the center of gravity of the said casing together with its connected parts being above said horizontal axis.

2. In a gyro-compass, the combination with a gyro-wheel adapted to be rotated in the opposite direction to the earth's rotation and a bearing casing therefor, of means for supporting the same for turning about a vertical axis, and for oscillation about a horizontal axis at an angle to its spinning axis, the center of gravity of the said casing together with its connected parts being above said horizontal axis.

3. In a gyro-compass, a gyroscope, means for supporting the same for orientation and for oscillation about a horizontal axis, said gyroscope being normally in unstable equilibrium, gravitationally, and means adapted to normally rotate said gyroscope in such a direction that the tendency of the gyroscope to depart from a position of neutral equilibrium causes precession toward the meridian.

4. A gyro-compass comprising a gyroscope adapted to be rotated in the opposite direction to the earth's rotation on its axis and gravitational means responsive to a departure of the gyroscope from the meridian for applying a torque about its horizontal axis in such direction as to cause precession toward the meridian.

5. A meridional gyroscope, including a top-heavy gyroscope adapted to be rotated in the same direction as the earth and means responsive to a departure of said gyroscope from the meridian for causing a torque to be exerted thereon causing precession toward the meridian.

6. A meridian gyroscope, including a top-heavy gyroscope adapted to be rotated in the same direction as the earth and means responsive to a departure of said gyroscope from the meridian for exerting a torque about its horizontal axis opposed to that exerted by gravity.

7. In a gyro-compass, the combination with a support mounted for orientation, of a gyroscope mounted thereon for turning about a vertical axis and for oscillation about a horizontal axis with respect thereto, said gyroscope being in unstable equilibrium about said horizontal axis and damping means therefor adapted to exert an accelerating torque about said vertical axis.

8. A meridional gyroscopic apparatus including a main support rotatable about a vertical axis, and a pair of gyroscopes adapted to be oppositely rotated, means for mounting said gyroscopes on said support for oscillation about horizontal axes, with the center of gravity of one of said gyroscopes normally above its horizontal axis.

9. In a gyro-compass, a support pivotally mounted about a vertical axis, a pair of gyros mounted thereon and connected for opposite precession about vertical axes and for independent oscillation about horizontal axes, said gyros being designed to rotate in the same direction and having their effective centers of gravity on opposite sides of their horizontal axes of support, and means responsive to relative precession of the gyros about their horizontal axes for exerting torques about their individual vertical axes.

10. In a multiple gyro-compass, the combination with a plurality of gyroscopes and a common rotatable support therefor, said gyroscopes being coupled for opposite precession about independent vertical axes within the frame, of means for aiding in setting the gyroscopes comprising an indicator adapted to indicate the relative position of a gyroscope with respect to said support.

11. In a gyro-compass, a gyroscope adapted to be rotated in the opposite direction to the rotation of the earth, means for mounting said gyroscope for rotation or oscillation about a vertical and horizontal axis, and means brought into action by oscillation about said horizontal axis for exerting a torque about its vertical axis.

12. In a gyroscopic compass, a rotor and rotor bearing frame, means for supporting the same for turning about a vertical and for oscillation about a horizontal axis, an independently supported base line for said frame, contacts operable between said base line and said frame, and means for exerting a torque about the vertical axis of said frame operable by said contacts.

13. In a gyroscopic compass, a rotor and rotor bearing frame, means for supporting the same for turning about a vertical and for oscillation about a horizontal axis, said rotor being adapted to be driven in either direction and an inverted pendulum operatively connected to said rotor.

14. A meridional gyro-compass including a gyroscope normally rotated in a counterclockwise direction looking north.

15. In a gyro-compass, a gyroscope, means for supporting the same for oscillation about a horizontal axis to one side of its effective center of gravity, and a releasable latch for holding said gyroscope with its center of gravity above its center of support.

16. In a gyro-compass, a support mounted for orientation, a pair of gyroscopes mounted thereon for oscillation about horizontal axes, one of said gyroscopes being gravitationally stable while the other is gravitationally unstable, the rotors of said gyroscopes being adapted to be driven in opposite directions.

17. In a gyro-compass, a support mounted for orientation, a plurality of oppositely rotated gyroscopes mounted for turning about vertical pivots, and a damping means for suppressing oscillations of the gyroscopes operable about the axes of said pivots.

18. In a gyro-compass, a support mounted for orientation, a plurality of oppositely rotated gyroscopes mounted thereon for turning about vertical pivots, and for oscillation about substantially horizontal pivots, and a damping means for suppressing oscillations of the gyroscopes operable about the axes of said pivots, said means being brought into action by tilting of a gyroscope about its horizontal axis.

19. A meridian seeking device comprising a gyroscope, means for rotating said gyroscope in a counterclockwise direction looking north and an inverted pendulum connected to said gyroscope.

20. In a gyroscopic compass, a rotor, a rotor bearing frame, means for supporting said frame for turning about a vertical axis, and means for supporting said frame for oscillation about a horizontal axis below its center of gravity, said rotor being adapted to be driven in either direction.

21. A gyro compass including a gyroscope adapted to be rotated in the opposite direction to the earth's rotation on its axis, means whereby the same is mounted for turning about a vertical and horizontal axis, and means responsive to inclination of the gyroscope for applying a torque about said horizontal axis in the direction of said inclination.

22. In a gyro compass, the combination with a gyroscope, of means brought into action by the inclination of the gyroscope about its horizontal axis for applying a torque about a vertical axis in the opposite direction to the torque exerted by damping means in a pendulous gyro compass.

23. In a gyro compass in which a gyroscope is rotated in the opposite direction to the earth, the combination with a support mounted for orientation, of a gyroscope mounted thereon for turning about a vertical axis with respect thereto, and damping means therefor adapted to exert an accelerating torque on the gyroscope about said vertical axis.

In testimony whereof, we have signed our names to this specification, this 25th day of May, 1915.

HARRY L. TANNER.
HERBERT H. THOMPSON.